Nov. 1, 1932.  E. E. WEMP  1,886,323
CLUTCH
Filed Oct. 22, 1930  2 Sheets-Sheet 2

INVENTOR.
ERNEST. E. WEMP
BY
*Barnes & Kisselle*
ATTORNEYS.

Patented Nov. 1, 1932

1,886,323

UNITED STATES PATENT OFFICE

ERNEST E. WEMP, OF DETROIT, MICHIGAN

CLUTCH

Application filed October 22, 1930. Serial No. 490,521.

This invention relates to a power transmitting mechanism useful in automotive vehicles and has to do especially with a mechanism embodying a clutch. Among the objects of the invention is the provision of a free wheeling device in which the free wheeling action may or may not be employed at the option of the operator while requiring substantially no additional skill on the part of the operator over that required in operating an automotive vehicle with the present standard transmission. Moreover, it is an object of the invention to provide a transmission of the type alluded to wherein the change-over from a free wheeling action to a non-free wheeling action, or vice versa, may be accomplished substantially instantaneously, and the desirability of this will become apparent as the detailed description progresses.

There are other objects of the invention which will be appreciated as the structure is understood; the construction advantageously employs primary and secondary clutches, one of which is designed to be effective only when the vehicle is moving at a reasonable rate of speed, and the particular type of clutch exemplified herein is one centrifugally controlled. The other clutch works in conjunction with the centrifugally controlled one and which performs the function of eliminating free wheeling, and which may also be utilized in starting or operating the car at speeds lower than that requisite to bring the centrifugal clutch into action. An advantageous construction contemplated by this invention is the disposition of the centrifugally controlled elements in the driven member of a clutch; these elements of necessity embody some weight which would result in an undesirable inertia of the driven parts; but the overrunning drive connection which effects the free wheeling action permits of disassociation of the centrifugally controlled elements relative to some of the driven parts so that the inertia in said some driven parts is minimized. This facilitates gear shifting after the manner appreciated by those skilled in the art.

Fig. 3 is a view of the clutch pedal pad.

The fly wheel of an engine, which is the driving member, is shown at 1, while the driven shaft is at 2. The shaft 2 may be the main driven shaft which extends into the usual transmission housing. The clutch housing is at 3.

Figure 2:
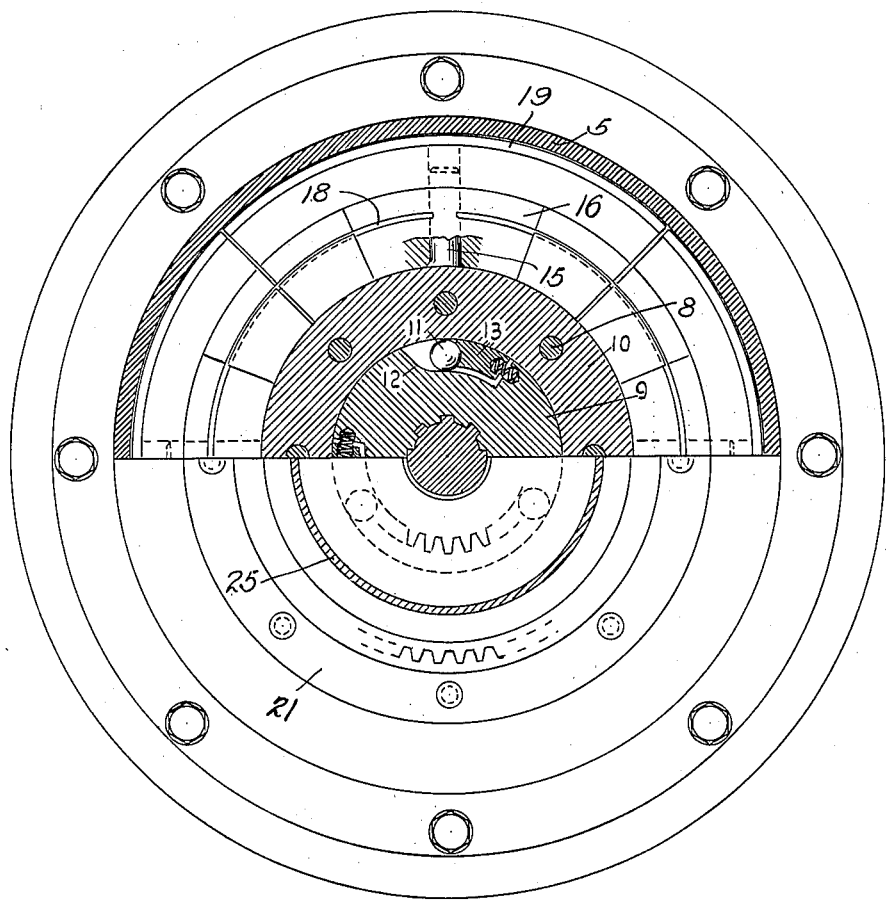
Fig. 2 is a composite section taken substantially on line 2—2 of Fig. 1.

The driving member also includes an element 5 having an internal circumferential clutch frictional face and it may be in the form of a ring-like member bolted to the fly wheel. Mounted upon the driven shaft 2, as by means of the usual spline connection is a hub-like member 6 which turns with the driven shaft. Over this member is a part of the driven device consisting of two ring-like members 7 secured together as by means of rivets 8 and on opposite sides of flange 9 of the member 6. Radially outward of the flange 9 is a spacer element 10 through which the rivets 8 pass. This unit which consists of the members 7 and 10 riveted together is rotatable relative to the member 6 and between them there is associated an overrunning or overriding clutch or drive connection. The flange 9 (Fig. 2) is recessed for the reception of a roller 11; the recess may be an inclined wall, as at 12, and the roller may be backed up by a spring-pressed plunger 13. Any suitable number of rollers may be provided. This exemplifies a type of overrunning drive connection, and it will be appreciated that, as Fig. 2 is viewed, if member 10 is rotated counter-clockwise, the several rollers are carried up against the inclined surfaces 12 to jam and drive the member 6, but that the member 6 may overrun the member 10, in which case the inclined surfaces 12 move away from the rollers 11.

The member 10 may advantageously support devices for frictionally engaging the interior face of the part 5, and as shown herein, the member 10 has a number of radially extending studs 15. In the present instance there are four of such studs, and each carries a weight 16 which has an aperture for receiving the stud. There are four of such weights and they are arranged to move radially outwardly under centrifugal action, to engage the driving member 5. The weights may be provided with clutch facing material 19. Suitable means are provided for normally holding the weights radially inward, and for this purpose the several weights may be slotted, as at 17, for the reception of split spring rings 18 which normally contract and hold the weights inwardly with the friction material 19 out of engagement with the face of the member 5.

In order that the operation of the construction thus far described may be understood, assume that the parts are rotating; the weights 16 are thrown outwardly centrifugally, engaging the driving member 5 thus causing rotation of the weights and the member 10. Through the means of the overrunning clutch or connection constituted by the rollers 11 and associated parts, the member 10 rotates the hub member 6 and with it the driven shaft. This rotation is a counter-clockwise direction, as Fig. 2 is viewed. Now, in the event that the driving parts are decelerated (as by means of decelerating the driving engine) the driven shaft 2 and its hub 6 may overrun; or in other words, rotate at a speed faster than the member 10 and the weights. This is the free wheeling action.

Inasmuch as the centrifugally controlled clutch members are mounted upon the driven member, means are provided for effecting initial movement. This means takes the form of what may be termed a secondary clutch, and here it may be said that the centrifugal clutch may be termed the primary clutch. The secondary clutch advantageously takes the form of a plurality of driving disks 20, having a toothed engagement with driving member 21 carried by member 5, and these driving disks are preferably provided with clutch facing material 22. Driven disks 23 have a toothed engagement with the driven member 24 mounted upon, as by means of the usual spline connection, the driven shaft 2.

A pressure ring 25 mounted upon a collar 26 is arranged to pack the disks 20 and 23 together under the action of a spring 27 situated within the collar. This spring is backed up by a suitable anti-friction bearing 30 which may be the usual bearing in which the shaft 2 is journaled and carried by the transmission housing.

The driving and driven disks may both be axially shiftable, and when packed together may butt up against one of the members 7, as shown, and the thrust is communicated through the driven parts of the clutch and resisted by a snap ring 31 mounted upon the driven shaft 2. The frictional engagement with the member 7 by the facing material on the innermost clutch disc 20 serves to impart rotation to the centrifugal weights.

Figure 1:
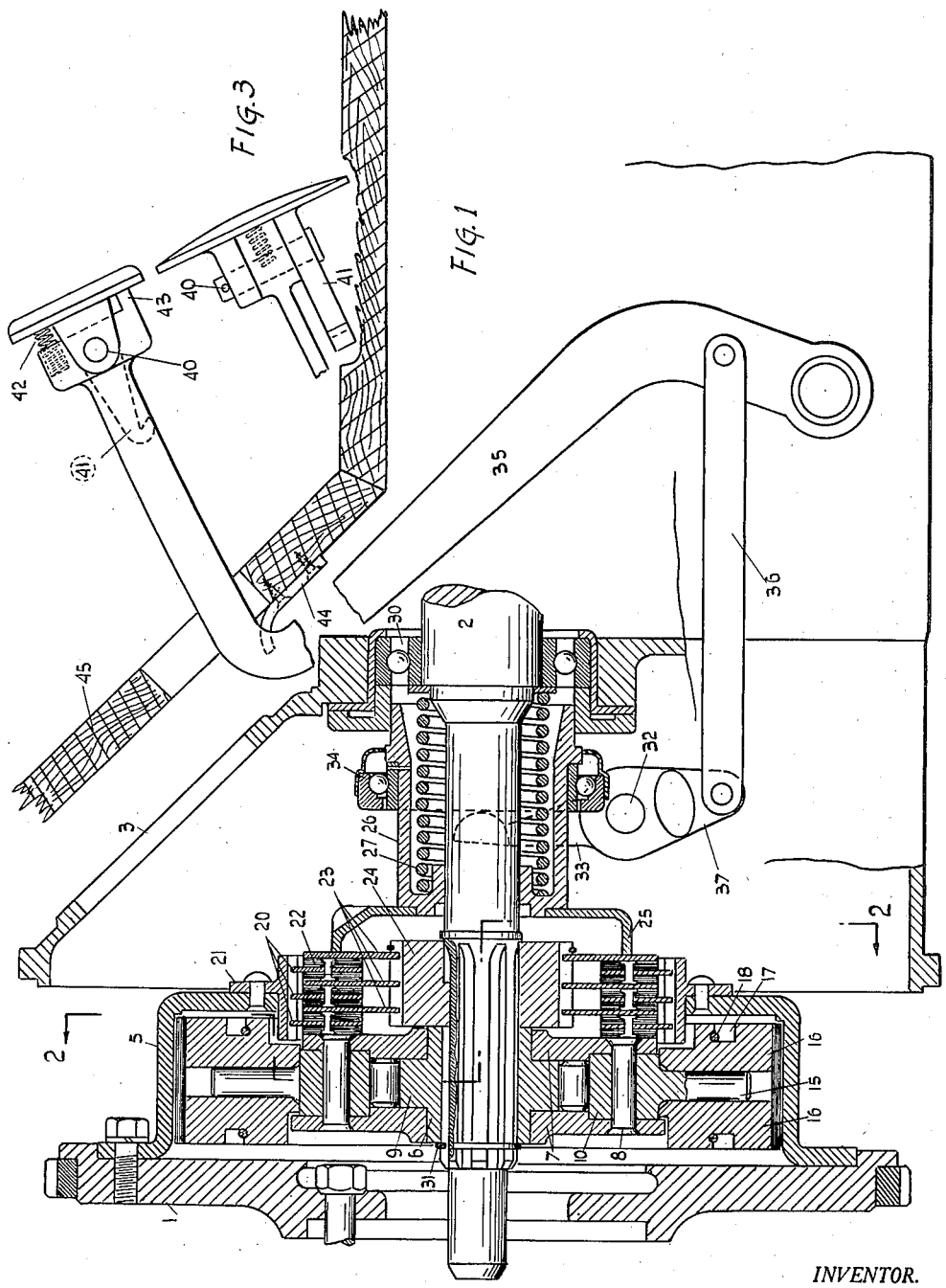
Fig. 1 is a sectional view taken through a clutch construction made in accordance with the invention showing some parts in elevation.

For the purpose of operating the secondary clutch the usual type of rock shaft 32 may be provided with forked members 33 acting upon the sleeve 26, in the present instance, preferably through an anti-friction bearing 34. To rock shaft 32 there may be the usual foot lever 35 connected to the shaft as by means of link 36 and arm 37. The secondary clutch may be held released, and for this purpose the foot pad on the lever 35 may be pivotally mounted thereon, as at 40, with one of its ears projecting to form hook 41. A spring 42, in the present instance a compression spring, holds the foot pad in normal position against abutment 43, at which time the hook is located within the confines of the lever as illustrated by the dotted lines (Fig. 1). A suitable catch, as for example a plate 44, which may be secured to the toe boards 45, is positioned for engagement with the hook 41 so that when the lever is depressed the operator may rock the foot pad against the action of the spring 42 and engage the hook behind the catch.

This secondary clutch may advantageously have a torque capacity considerably less than that required in the particular vehicle having due regard to the power of the engine, the weight of the vehicle, etc., and for example, the secondary clutch may have in the neighborhood of 30% of the required torque capacity. When a car is standing idle with the driving parts rotating there is no way of causing the centrifugal clutch to become engaged. However, to start the car in motion the secondary clutch is engaged in the usual manner of engaging the clutch and the interengaging clutch disks 20 and 23 impart rotation to the driven shaft. This will start the car in motion, and when the R. P. M. of the driven parts have increased enough to throw out the weights 16 the primary clutch becomes engaged. After the weights are once thrown outwardly, it is preferred that the idling speed of the engine be high enough to keep them in outward position. When a prolonged free wheeling action is had, with the engine idling, the centrifugal weights remain effective so that it is not necessary to manipulate the secondary clutch at the end of the free wheeling action. Another time when the secondary clutch may be used is, for example, when it is necessary to tow or push the car to start the engine. This cannot be accomplished with the overrun connection even if sufficient speed were developed to set the centrifugal clutch into action, but it can be done with the secondary clutch which cuts out over-running action.

In starting up an automotive vehicle the operation may be identical with the operation of the present existing vehicle; the operator first disengages the secondary clutch, shifts into low gear, re-engages the clutch; disengages the clutch and enters second gear, re-engages the clutch; again disengages the clutch and enters third gear or high, re-engages the clutch, and the vehicle operates in the usual manner as the secondary clutch is sufficient for this purpose and the overrun connection while in condition ready for work is held from operation by the secondary clutch. The engine at this time may be used as a brake or decelerating medium for the vehicle. To free-wheel it is but necessary for the operator to depress the pedal and then by rocking the pad hold the secondary clutch disengaged. The drive is now solely through the primary clutch and overrun connection. At any time the engine is decelerated the car glides along with the driven shaft 2 overrunning other driven parts.

Gear shifting is rendered easy because of the relatively small amount of inertia of the overrunning parts. These overrunning parts comprise the shaft 2, hub member 6 and the member 24 and disks 23 of the secondary clutch. It will be noted that these parts are positioned relatively close to the axial center of the shaft thus minimizing the inertia. Although the centrifugally controlled weights form part of the driven member, their inertia is not effective upon the driven parts above mentioned. When operating with the free wheeling action it is sometimes desirable that the compression of the engine be employed as a braking or decelerating agency for the vehicle. There are times when there must be no delay in effecting this action, and the present construction provides for immediate transfer from free wheeling to positive drive for this purpose. When an operator is operating the car with the secondary clutch locked out, it is but necessary for him to trip the pedal pad and the secondary clutch becomes engaged and the free wheeling action is cut out.

An important feature in the construction is that the thrust of the packing spring of the secondary clutch is at no time communicated to driving parts or engine as is the case in the usual construction at the present time. When the secondary clutch is engaged the packing spring is backed up by the anti-friction bearing 30 and resisted by the ring 31. When the clutch is disengaged, and it will be disengaged in much of the automotive operation, the thrusts are taken by the two anti-friction bearings 30 and 34. These bearings are preferably both well lubricated, and for this purpose both may connect into the transmission with the lubricant having access to the interior of the collar 26 and out through suitable openings into bearing 34.

Accordingly, it will be noted that a free wheeling centrifugal clutch is provided in conjunction with a secondary clutch functioning to cut out the free wheeling action and to effect initial rotation of the centrifugal clutch. There is nothing for the ordinary operator to learn in the handling of his car as the construction may be handled in a manner identical with the present standard transmission and clutch. The simple action of depressing the pedal and locking it out effects the free wheeling action whenever desired (provided there is sufficient speed) and the simple action of tripping the pedal pad cuts out the free wheeling action. By using the term "cut out" it is not meant that the overrunning clutch is rendered inoperative as it remains ready to operate at any time but that merely a direct drive is provided. It is contemplated that the speed sufficient to bring the centrifugal clutch into play will be relatively low, as for example, only a few miles an hour, so that all that will be necessary is to merely give the car a reasonable start, then the free wheeling action and centrifugal clutch may be employed at all speeds above the starting speed.

I claim:

1. The combination of a driving member, a driven member, centrifugal clutch members carried by the driven member for engaging the driving member, an overrunning clutch between the centrifugal clutch members and the driven member, and controllable means for imparting rotation to the centrifugal clutch members.

2. The combination of a driving member of a clutch, a driven shaft, centrifugal clutch members carried by the driven shaft for engaging the driving clutch member, a one way drive connection between the centrifugal clutch members and the shaft, and means for imparting rotation to the centrifugal clutch members from the rotation of the driving member.

3. The combination of a driving member, a driven shaft, a hub-like element secured to the shaft to rotate therewith, a rotary element around the hub-like element, a one-way drive connection between said rotary element and hub-like element, centrifugally controlled clutch members carried by said rotary element and adapted to engage the driving member when moved by centrifugal action, and controllable means for imparting rotation to the centrifugally controlled clutch members.

4. The combination of a driving member, a driven shaft, a hub-like element secured to the shaft to rotate therewith, a rotary element around the hub-like element, a one-way drive connection between said rotary element and hub-like element, a plurality of weighted clutch members carried by the rotary element for movement radially as regards the driven shaft, means holding said weighted members normally inward toward the shaft, said members being adapted to move radially outward by centrifugal action and frictionally engage the driving member, and means for imparting initial rotation to said weighted clutch members.

5. The combination of a driving member, a driven shaft, a hub-like member mounted on the shaft to rotate therewith, a ring-like device surrounding the hub, a one way drive connection between said ring-like device and hub-like member, a plurality of radially outward extending studs on the ring-like member, a clutch member mounted on each stud and reciprocable thereon, said clutch members being adapted to move outwardly by centrifugal action to frictionally engage the driving member, means for normally holding said clutch members radially inward away from the driving member, and controllable means for imparting rotation to said clutch members.

6. The combination of a driving member, a driven shaft, a hub-like member mounted on the shaft to rotate therewith, a ring-like device surrounding the hub, a one way drive connection between said ring-like device and hub-like member, a plurality of radially outward extending studs on the ring-like member, a clutch member mounted on each stud and reciprocable thereon, said clutch members being adapted to move outwardly by centrifugal action to frictionally engage the driving member, means for imparting rotation to said clutch members said clutch members being slotted, and a contracting spring element positioned in the slots normally holding the clutch members radially inward.

7. The combination of a driving member, a driven shaft, centrifugally controlled clutch members carried by the driven shaft, a one way drive connection between said centrifugally controlled clutch members and the driven shaft, and another clutch for establishing a direct drive connection between the driving member and shaft for imparting rotary movement to the centrifugally controlled parts.

8. The combination of a driving member, a driven shaft, a primary clutch comprising centrifugally controlled clutch members carried by the shaft arranged to frictionally engage the driving member by centrifugal action when rotating, a one way drive connection between the centrifugally controlled clutch members and the driven shaft, and a secondary clutch for establishing a direct drive connection between the driving member and shaft for imparting initial movement to the centrifugally controlled primary clutch.

9. The combination of a driving member, a driven shaft, a primary clutch comprising centrifugally controlled clutch members carried by the shaft arranged to frictionally engage the driving member by centrifugal action when rotating, a one-way drive connection between the centrifugally controlled clutch members and the driven shaft, and a secondary clutch for establishing a direct frictional drive connection between the driving member and shaft for imparting initial movement, and means for holding the secondary clutch released.

10. The combination of a driving member, a driven shaft, a primary clutch comprising centrifugally controlled clutch members carried by the shaft arranged to frictionally engage the driving member by centrifugal action when rotating, a one-way drive connection between the centrifugally controlled clutch members and the driven shaft, and a secondary clutch for establishing a direct drive connection between the driving member and shaft for imparting initial movement, a control lever for releasing and permitting engagement of the secondary clutch, and means for holding the control lever in clutch released position.

11. The combination of a driving member, a driven shaft, a primary clutch comprising centrifugally controlled clutch members carried by the shaft arranged to frictionally engage the driving member by centrifugal action when rotating, a one-way drive connection between the centrifugally controlled clutch members and the driven shaft, and a secondary clutch for establishing a direct frictional drive connection between the driving member and shaft for imparting initial movement, a control lever for releasing and permitting engagement of the secondary clutch, and means for holding the control lever in clutch released position, said means comprising a movable hook member on the lever, and a catch for engagement with said hook.

12. A clutch construction for an automotive vehicle or the like comprising driving and driven members, a primary clutch centrifugally controlled carried by the driven member, a secondary clutch between the driving and driven members to effect initial rotary movement of the centrifugal primary clutch, and a one-way drive connection between the primary clutch and the driven member.

13. A clutch construction for an automotive vehicle or the like comprising driving and driven members, a primary clutch centrifugally controlled carried by the driven member, a secondary clutch having clutching elements separate from the primary clutch between the driving and driven members to effect initial rotary movement of the centrifugal primary clutch, and means for locking out the secondary clutch.

14. A clutch construction for an automotive vehicle or the like comprising driving and driven members, a primary clutch centrifugally controlled carried by the driven member, and a secondary clutch between the driving and driven members to effect initial rotary movement of the centrifugal primary clutch, a one-way driving connection between the centrifugal clutch and the driven member, and means for locking out the secondary clutch adapted to be utilized after the centrifugal clutch becomes operative.

15. A clutch construction for an automotive vehicle comprising in combination a fly wheel, a driving member associated with the fly wheel having an interior clutch face, a driven shaft, centrifugally controlled elements carried by the driven shaft adapted to engage said clutching face when moved by centrifugal action, a one-way drive connection between the driven shaft and centrifugal clutch, a secondary clutch comprising clutch disks keyed to the driving member, clutch disks keyed to the driven shaft, and means for packing the clutch disks together and for releasing them from packed relation.

16. A clutch construction for an automotive vehicle comprising in combination a fly wheel, a driving member associated with the fly wheel having an interior clutch face, a driven shaft, centrifugally controlled elements carried by the driven shaft adapted to engage said clutching face when moved by centrifugal action, a one-way drive connection between the driven shaft and centrifugal clutch, a secondary clutch comprising clutch disks keyed to the driving member, clutch disks keyed to the driven shaft, spring means for packing the clutch disks together, and means carried by the driven shaft for resisting the thrust of the spring means.

17. A clutch construction for an automotive vehicle comprising in combination a fly wheel, a driving member associated with the fly wheel having an interior clutch face, a driven shaft, centrifugally controlled elements carried by the driven shaft adapted to engage said clutching face when moved by centrifugal action, a one-way drive connection between the driven shaft and centrifugal clutch, a secondary clutch comprising clutch disks keyed to the driving member, clutch disks keyed to the driven shaft, spring means for packing the clutch disks together, means for acting against said spring to release the clutch disk and hold it released, and antifriction bearings for taking the thrust of the spring when the clutch disks are released.

18. A clutch device for an automotive vehicle or the like comprising a driving fly wheel, a driven shaft, centrifugally controlled clutch members on the driven shaft, a one-way driving connection between the clutch members and the driven shaft, a secondary clutch having frictionally engaging parts secured in driving relation, respectively, to the driving fly wheel and driven shaft, means for packing the said parts together to impart initial rotary movement to the centrifugally controlled clutch members, and means for holding the secondary clutch in released position.

In testimony whereof I affix my signature.
ERNEST E. WEMP.